(12) United States Patent
Boss et al.

(10) Patent No.: US 7,874,011 B2
(45) Date of Patent: Jan. 18, 2011

(54) AUTHENTICATING USER IDENTITY WHEN RESETTING PASSWORDS

(75) Inventors: Gregory J. Boss, American Fork, UT (US); Peter G. Finn, Brampton (CA); Rick A. Hamilton, II, Charlottesville, VA (US); Timothy M. Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 809 days.

(21) Appl. No.: 11/565,731

(22) Filed: Dec. 1, 2006

(65) Prior Publication Data

US 2008/0134317 A1 Jun. 5, 2008

(51) Int. Cl.
G06F 7/04 (2006.01)
G06F 21/00 (2006.01)

(52) U.S. Cl. .................. 726/28; 726/2; 726/5; 726/16; 726/17; 726/18; 726/19; 726/26; 726/27; 726/29; 726/30; 713/182; 713/183; 713/184

(58) Field of Classification Search ................ 726/2–5, 726/26–30, 16–19; 713/182–184; 709/223, 709/224, 246
See application file for complete search history.

(56) References Cited

U.S. PATENT DOCUMENTS

| | | | |
|---|---|---|---|
| 6,609,198 B1 | 8/2003 | Wood et al. | |
| 6,691,232 B1 | 2/2004 | Wood et al. | |
| 6,734,886 B1 * | 5/2004 | Hagan et al. | 715/853 |
| 6,973,575 B2 | 12/2005 | Arnold | |
| 7,047,560 B2 | 5/2006 | Fishman et al. | |
| 7,383,575 B2 | 6/2008 | Cheston et al. | |
| 7,613,919 B2 | 11/2009 | Bagley | |
| 2001/0034837 A1 | 10/2001 | Kausik et al. | |
| 2002/0116661 A1 * | 8/2002 | Thomas et al. | 714/17 |
| 2002/0147914 A1 | 10/2002 | Arnold | |
| 2003/0163714 A1 * | 8/2003 | Nortung | 713/189 |
| 2003/0204724 A1 | 10/2003 | Ayyagari et al. | |
| 2004/0039906 A1 | 2/2004 | Oka et al. | |
| 2005/0044376 A1 | 2/2005 | Libin | |
| 2005/0081044 A1 | 4/2005 | Giles et al. | |
| 2005/0097106 A1 * | 5/2005 | Lineman | 707/10 |
| 2005/0138399 A1 | 6/2005 | Cheston et al. | |
| 2006/0036871 A1 | 2/2006 | Champine et al. | |
| 2006/0037073 A1 * | 2/2006 | Juels et al. | 726/17 |
| 2006/0059361 A1 * | 3/2006 | Paden et al. | 713/184 |

(Continued)

*Primary Examiner*—Taghi T Arani
*Assistant Examiner*—Madhuri Herzog
(74) *Attorney, Agent, or Firm*—Yee & Associates, P.C.; William H. Steinberg; Rudolf O. Siegesmund

(57) ABSTRACT

The "identity authentication program" (IAP) creates a custom set of authentication questions in response to a user request to have a user password reset. The IAP accesses a record located in a data source containing information related to the user's recent computer activity and generates an authentication question and a corresponding answer based on the record. In order to reset a user password, the user must correctly answer a designated number of questions from the custom set of authentication questions. In a preferred embodiment, the IAP bases authentication questions on recent e-mail messages sent by the user. Because the questions are generated at the time of the user's request, the answers are unique and can not be memorized. Because the questions are based on recent activities of the user, the questions are hard to guess by an unauthorized person.

15 Claims, 4 Drawing Sheets

U.S. PATENT DOCUMENTS

| | | |
|---|---|---|
| 2006/0059362 A1 | 3/2006 | Paden et al. |
| 2006/0080545 A1 | 4/2006 | Bagley |
| 2006/0095785 A1 | 5/2006 | White, Jr. |
| 2007/0271601 A1* | 11/2007 | Pomerantz .................... 726/5 |

* cited by examiner

AUTHENTICATING USER IDENTITY WHEN RESETTING PASSWORDS

FIELD OF THE INVENTION

The invention relates generally to the field of information security and relates specifically to user authentication for retrieving and resetting security credentials.

BACKGROUND OF THE INVENTION

As computers have become prevalent in schools and the workplace, users are assigned passwords to gain access to an organization's computerized resources. Passwords are required for users to log on to the network, retrieve e-mail, access restricted information and use restricted applications. Rather than requiring users to remember multiple passwords, many organizations use a password manager program that assigns to each user a single password used for accessing all of the organization's computerized resources.

In order to provide a higher level of security, password manager programs often assign strong passwords. Strong passwords generally comprise at least eight randomly generated characters that include a combination of letters and numbers and sometimes include other special characters. To further enhance security, passwords may change at regular intervals. Because randomly generated strong passwords do not spell out a word, phrase, or date, randomly generated strong passwords are often difficult for users to remember. Frequent password changes increase the difficulty users have remembering passwords. Thus, organizations provide a mechanism for users to retrieve or reset their forgotten passwords. Often, automated mechanisms for retrieving and resetting passwords alleviate the need for live technical support.

One known automated mechanism for retrieving or resetting forgotten passwords utilizes an interactive World Wide Web interface, a user identification, and a predefined challenge phrase. The user provides a user identification and then responds to a prompt for a predefined challenge phrase. The predefined challenge phrase is an easy to remember phrase previously provided by the user such as the name of a pet, the make of a first car, or the maiden name of the user's mother. After the user responds correctly, the password is sent to the user via e-mail. There are two drawbacks to a system using a predefined challenge phrase. First, the challenge phrase can be known to persons close to the user. Second, receiving an e-mail with the password is impractical if the user cannot access e-mail without the forgotten password. To overcome the problem of not being able to access e-mail to retrieve a password when the user has forgotten the password, live or automated operators are often employed by telephone systems to administer the challenge phrase or other identity authentication and to provide the password.

Another automated mechanism for retrieving or resetting forgotten passwords via a telephone system uses a second, easy to remember password or Personal Identification Number ("PIN") to authenticate the user's identity. There are drawbacks to using a PIN because the PIN never expires, the PIN may get copied down, or the PIN may be used in multiple places. As with challenge phrases, these shorter, less secure passwords have a high risk of discovery by others and weaken the higher level of security provided by the strong password.

One known solution to overcome the limitations encountered when using challenge phrases and secondary passwords for user authentication is voice biometric verification. Voice biometric verification systems use a person's individual speech patterns, called a voice fingerprint, to authenticate identity. Voice biometric verification systems have certain limitations. Bad connections or interference caused by long distance, cellular calls and voice over Internet protocol ("VoIP") phone systems make voice biometric verification unreliable. Moreover, voice biometric verification may improperly grant access to a caller other than the user, if the caller uses a voice recording of the user. Because of these problems, security experts question the efficacy of voice biometrics over the telephone.

All security systems seek a balance between a risk of false acceptance and a risk of false rejection. If a security threshold is too stringent, there exists a risk of false rejection which frustrates authorized users who cannot access the secured resources. If the security threshold is too lax, there exists a risk of false acceptance which allows unauthorized users access to secured resources. A need exists for an improved automated method of verifying a user's identity for resetting passwords that does not rely on memorized challenge phrases or biometric voice identification, but which provides unique identity authentication questions that are easy for an authorized user to answer, and difficult for an unauthorized user to answer.

SUMMARY OF THE INVENTION

An "identity authentication program" (IAP), meets the needs identified above by creating a custom set of authentication questions in response to a user request to have a user password reset. The IAP accesses a record located in a data source containing information related to the user's recent computer activity and generates an authentication question and a corresponding answer based on the record. In order to reset a user password, the user must correctly answer a designated number of questions from the custom set of authentication questions.

In a preferred embodiment, the IAP bases authentication questions on recent e-mail messages sent by the user. The IAP opens at least one recent e-mail message sent by the user and identifies a set of non-trivial key words in the email message. The IAP provides the user with the recipient's name and the subject line, and prompts the user to enter key words. The user must respond with a certain number of the identified set of non-trivial key words within a predefined number of attempts. For example, the user must identify three of five keywords within five attempts.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

DETAILED DESCRIPTION OF THE PREFERRED EMBODIMENT

The principles of the present invention are applicable to a variety of computer hardware and software configurations.

The term "computer hardware" or "hardware," as used herein, refers to any machine or apparatus that is capable of accepting, performing logic operations on, storing, or displaying data, and includes without limitation processors and memory; the term "computer software," or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the "identity authentication program" ("IAP").

Figure 1:
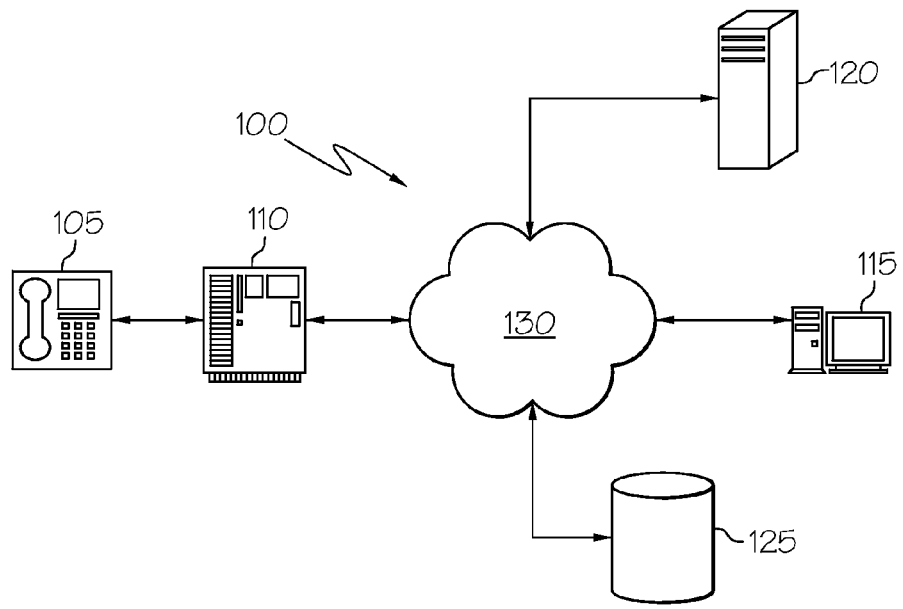
FIG. 1 is an exemplary computer network.

Additionally, the IAP is described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including telephone 105, computerized telephone switch 110, workstation computer 115, server computer 120, and persistent storage 125. Network connection 130 comprises all hardware, software, and communications media necessary to enable communication between network nodes 105-125. Unless otherwise indicated in context below, all network nodes use publicly available protocols or messaging services to communicate with each other through network connection 130. In a preferred embodiment, computerized telephone switch 110 is adapted to use voice recognition software and speech synthesis software for implementing the user interface component of the IAP.

Figure 2:
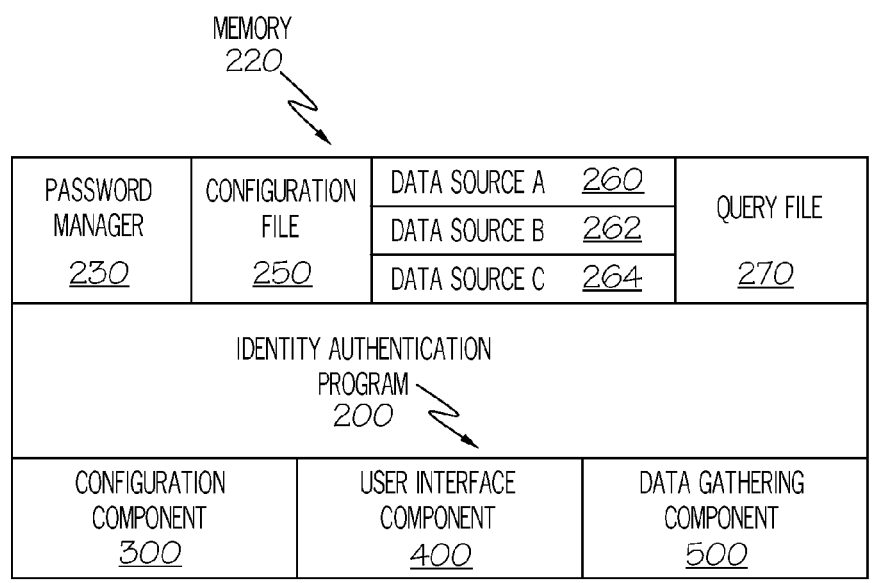
FIG. 2 describes programs and files in a memory on a computer.

IAP 200 typically is stored in a memory, represented schematically as memory 220 in FIG. 2. The term "memory," as used herein, includes without limitation any volatile or persistent medium, such as an electrical circuit, magnetic disk, or optical disk, in which a computer can store data or software for any duration. A single memory may encompass and be distributed across a plurality of media. Further IAP 200 may reside in more than one memory distributed across different computers, servers, logical partitions, or other hardware devices, such as a computerized telephone switch. The elements depicted in memory 220 may be located in or distributed across separate memories in any combination, and IAP 200 may be adapted to identify, locate and access any of the elements and coordinate actions, if any, by the distributed elements. Thus, FIG. 2 is included merely as a descriptive expedient and does not necessarily reflect any particular physical embodiment of memory 220. As depicted in FIG. 2, though, memory 220 may include additional data and programs. Of particular import to IAP 200, memory 220 may include password manager 230, configuration file 250, data source A 260, data source B 262, data source C 264, and query file 270 with which IAP 200 interacts. IAP 200 has three components: configuration component 300, user interface component 400 and data gathering component 500.

Password manager 230 exists in the art and manages the single user identification and password for an organization's computerized resources. IAP 200 can be adapted to integrate with or interact with password manager 230. Configuration component 300 allows a system administrator to define settings related to IAP 200 and saves the settings to configuration file 250. Specifically, the system administrator uses configuration component 300 to select a data source from which IAP 200 generates authentication questions. User interface component 400 prompts a user for a user identification, asks the user an authentication question, and verifies the user's answers before providing the user with a new password. Data gathering component 500 generates questions and answers used by user interface component 400 based on information in a data source, such as data source A 260. Data source A 260, data source B 262, and data source C 264 contain records related to recent user computer activities. For example data source A 260 may be a user's e-mail repository in persistent storage 125, data source B 262 may be a network event log located on server computer 120, and data source C 264 may be a local event log saved on workstation computer 115. The questions and answers created by data gathering component 500 are saved to query file 270.

Figure 3:
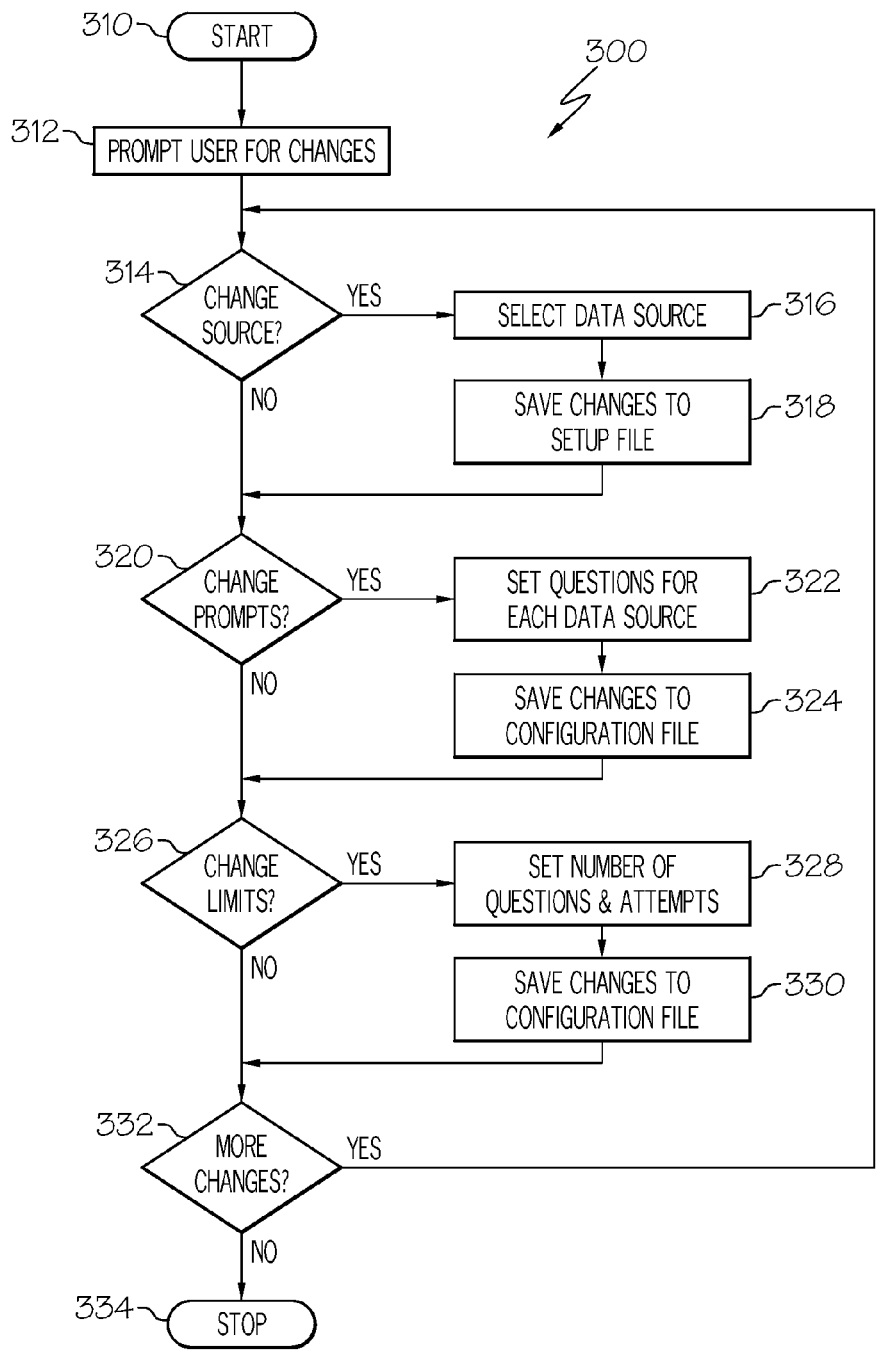
FIG. 3 is a flowchart of a setup component.

Referring to FIG. 3, configuration component 300 starts when initiated by a system administrator (310). Configuration component 300 prompts the system administrator for changes to the setup of IAP 200 using voice prompts or visual cues such as radio buttons or drop down menus (312). If the system administrator wants to change the source of recent computerized activities on which to base authentication questions (314), the system administrator selects a data source, such as data source A 260 (316) and configuration component 300 saves the changes to configuration file 250 (318). Each data source is a collection of records related to a user's recent computerized activities. In this example data source A 260 is a user's e-mail repository in persistent storage 125, data source B 262 is a network event log located on server computer 120, and data source C 264 is a local event log saved on workstation computer 115. Network event logs may contain records of statistics related to how many times the user logged on or logged off to the network, or accessed certain files on the network. Local event logs may contain records of statistics related to how many times the user restarted the computer, experienced a computer crash, removed a CD or DVD, connected a PDA or MP3 player to the computer, or connected the computer to a wireless network within a fixed period of time. Similarly, a data source may relate to recent chat or IM sessions, recently accessed web sites, or other computer applications accessed by the user. If the system administrator wants to change the authentication questions related to records in a data source, such as data source A 260 (320), the system administrator selects a set of authentication questions (322) and configuration component 300 saves the changes to configuration file 250 (324). The system administrator can select from several questions for different embodiments the data source, such as data source A 260. For example, if data source A 260, an e-mail repository, is selected, the records are e-mails. The prompt may provide the recipient, the date, and the time of an e-mail message, and the authentication question may request non-trivial key words included in the e-mail message. Other authentication questions may request information about other details in the e-mail message such as names of blind-copied recipients or if the message has any attachments or replies. If the system administrator wants to change the number of authentication questions, the number of allowed attempts, or the number of correct answers required (326), the system administrator sets the number of authentication questions, allowed attempts and correct answers (328) and configuration component 300 saves the changes to configuration file 250 (330).

Figure 4:
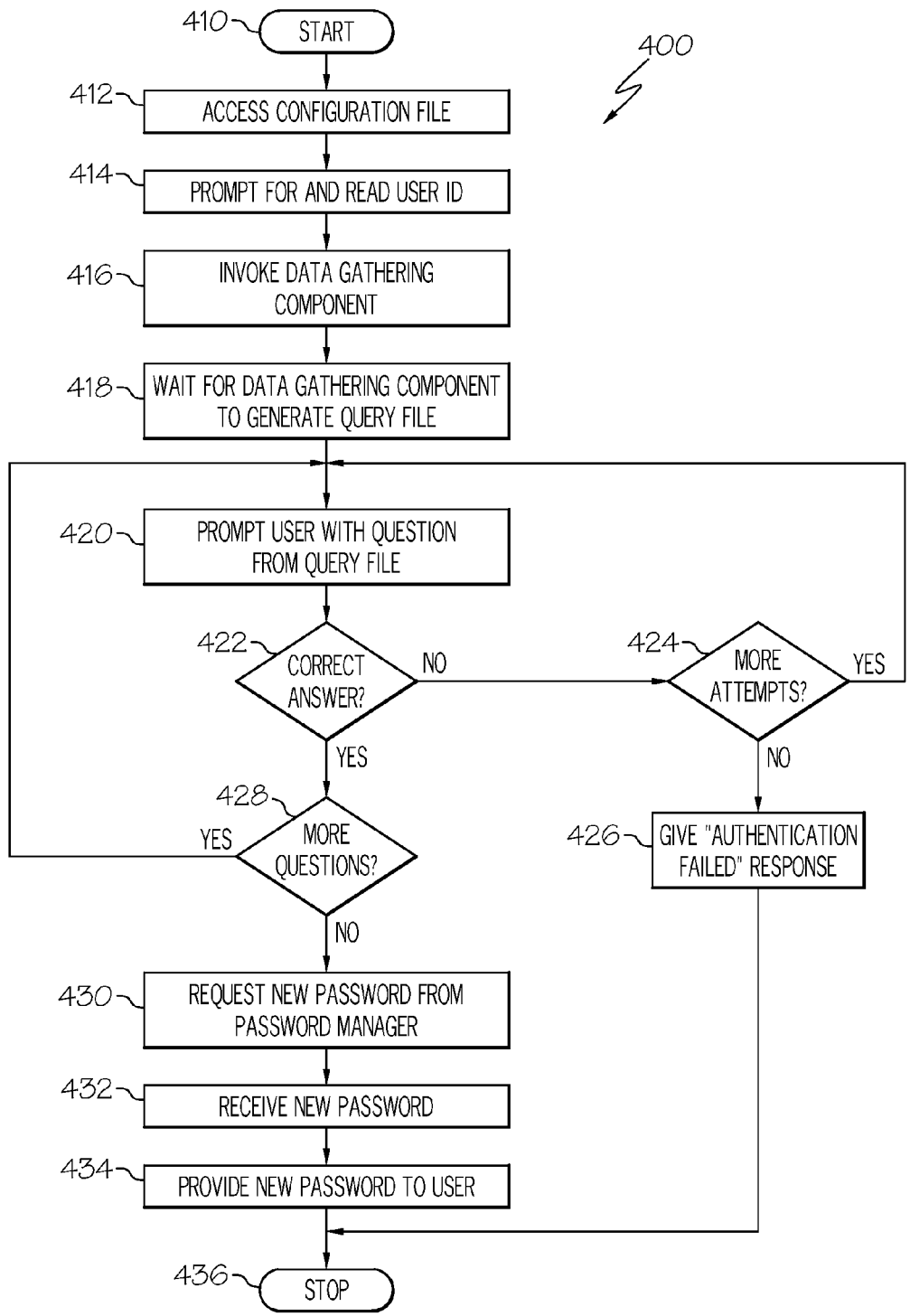
FIG. 4 is a flowchart of a user interface component.

Referring to FIG. 4, user interface component 400 starts when accessed by a user seeking to retrieve or reset a password (410). User interface component 400 accesses configuration file 250 (412), prompts the user for a user identification, and reads the supplied user identification (414). User interface component 400 invokes data gathering component 500 (416) and provides the user identification. User identification component 400 waits for data gathering component 500 to generate query file 270 (418). User interface component 400 prompts the user with an authentication question from query file 270 (420) and determines if the response is correct by comparing the user's response to the answer in query file 270 (422). If the user's response is incorrect at step 422, user interface component 400 determines if more attempts to answer the authentication question are available based on the requirements of configuration file 250 (424). If more attempts are available at step 424, user interface goes back to step 420 and prompts the user by repeating the same authentication question. If more attempts are not available at step 424, user interface gives an "authentication failed" response (426) and stops (436). If the user's response is correct at step 422, user interface component 400 determines if more authentication questions need to be asked based on the requirements of configuration file 250 (428). If more authentication questions need to be asked at step 428, user interface component 400 goes back to step 420 and prompts the user with a different authentication question. If more authentication questions need not be asked at step 428, user interface component 400 requests a new password from password manager 230 (430). Password manager 230 resets the user's password, or provides the user's existing password, depending on how password manager 230 is configured. User interface component 400 receives the new password from password manager 230 (432), provides the new password to the user (434) and stops (436).

Figure 5:
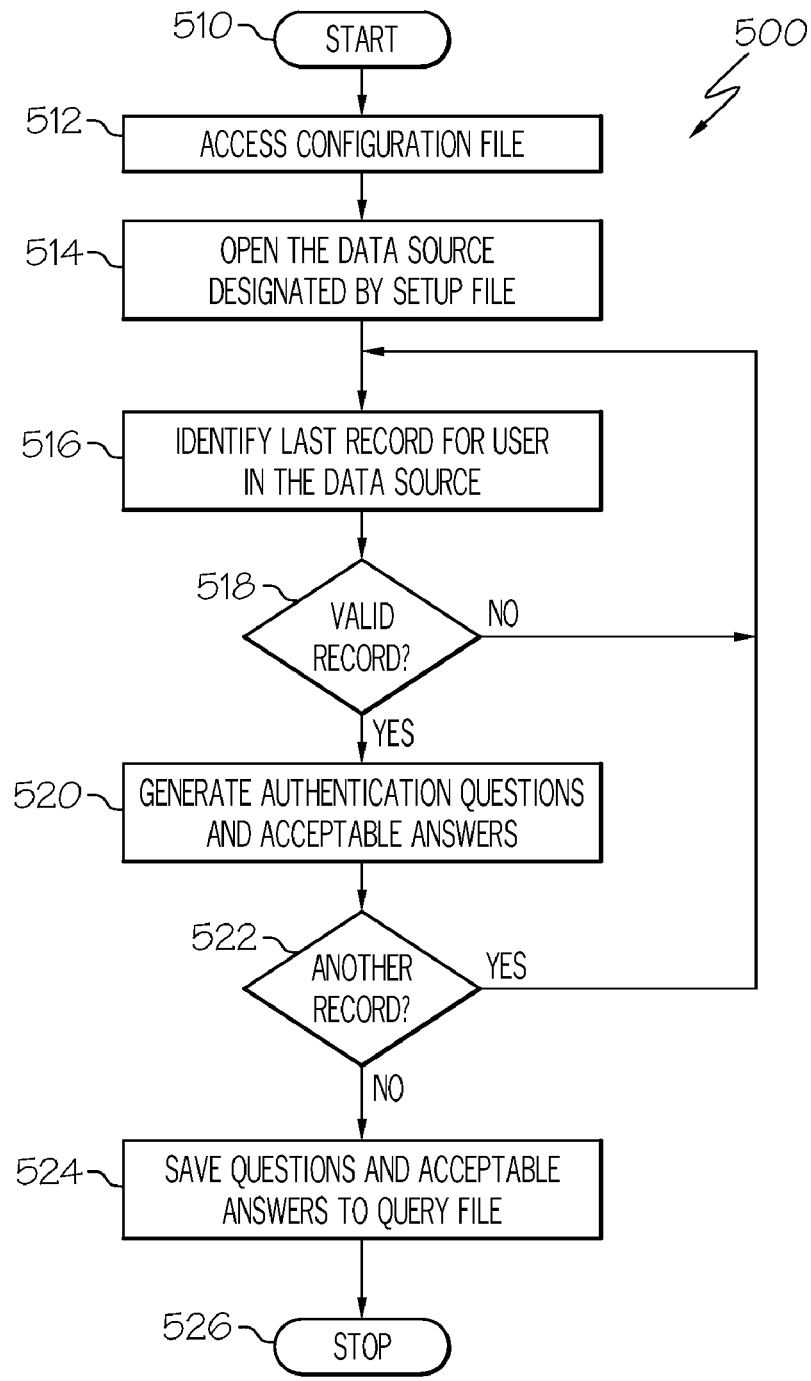
FIG. 5 is a flowchart of a data gathering component.

Referring to FIG. 5, data gathering component 500 starts when initiated by user interface component 400 (510). Data gathering component 500 accesses setup file 250 (512) and opens the data source designated by configuration file 250, such as data source A 260 (514). Data gathering component 500 identifies the last record associated with the user identification received from user interface component 400 in data source A 260 (516). Data gathering component 500 verifies that the record is a valid record and is capable of being used as a source of information for authentication questions as specified in setup file 250 (518). In this example, data source A 260 is an email repository, and the last record is the last e-mail sent. The e-mail message must have sufficient non-trivial content to be a valid record for generating an authentication question. For data source B 262 containing a network usage log and for data source C 264 containing a local usage log, the last record should have statistics of recent activities from the current day to be a valid record. If data gathering component 500 determines that the last record is not a valid record at step 518, data gathering component 500 goes back to step 516 and selects the next record. If data gathering component 500 determines that the last record is a valid record at step 518, data gathering component 500 generates authentication questions and answers based on the record and the requirements of configuration file 250 (520). Data gathering component determines if another record is required by configuration file 250 (522). If data gathering component 500 determines another record is required at step 522, data gathering component 500 goes back to step 516 and selects the next record. If data gathering component 500 determines no other records are needed at step 518, data gathering component 500 saves the authentication questions and answers to query file 270 (524) and stops (526).

A preferred form of the invention has been shown in the drawings and described above, but variations in the preferred form will be apparent to those skilled in the art. In particular, IAP 200 can be implemented on a graphical user interface, on a World Wide Web based application using text rather than voice telephony. In an alternate embodiment, IAP 200 bases authentication questions on other details about recent e-mail messages besides keywords, such as the name of a blind-copied recipient, or whether the message received a response, whether the message was filed or whether the message was deleted. The IAP 200 may also use authentication questions asking how many times the user performed other computerized tasks within a fixed period of time. Other embodiments of IAP 200 may use wireless communication devices such as cellular phones and PDAs that combine voice, text and graphical interfaces. The preceding description is for illustration purposes only, and the invention should not be construed as limited to the specific form shown and described. The scope of the invention should be limited only by the language of the following claims.

What is claimed is:

1. An automated computer implemented process for authenticating a user's identity before resetting a password, the computer implemented process comprising:

connecting a password reset program to an e-mail repository of a user, a network event log of the user located on a server, and a local event log saved on a workstation computer of the user;

selecting a data source from at least one of the e-mail repository, the network event log located on the server, or the local event log saved on the workstation computer;

receiving an identification of the user;

responsive to receiving the identification of the user, accessing a record located in the data source containing an information related to a recent computer activity of the user recorded in the data source;

generating an authentication question and a corresponding answer based on the record;

asking the user the authentication question;

comparing the reply to the corresponding answer; and responsive to the reply matching the corresponding answer, providing a new password to the user;

wherein the data source is the e-mail repository and the record is an email message;

wherein the network event log contains an information regarding at least one of how many times the user logged on to the network, how many times the user logged off the network, how many times a certain file was accessed on the network, a recent chat session, a recent instant messaging session, a recently accessed web site, or a computer application accessed by the user;

wherein the local network log contains a record regarding at least one of how many times the user restarted the computer, how many times the user experienced a computer crash, how many times the user removed a CD, how many times the user removed a DVD, how many times the user connected a personal display assistant, how many times the user connected an MP3 player to the computer, or how many times the user connected the computer to a wireless network within a fixed period of time; and wherein a prompt provides a recipient, a date, and a time of the email message, and the authentication question asks for at least one of a set of non-trivial key words included in the email message, a name of a blind-copied recipient of the email message, whether the email message received a response, whether the email message was filed, whether the email message was deleted, whether the email message has any attachments or whether the email message has any reply messages.

2. The computer implemented process of claim 1 wherein the user must reply with a sub-set of the set of non-trivial key words within a predefined number of attempts.

3. The computer implemented process of claim 1 wherein the interactions with the user are made via voice telephony.

4. The computer implemented process of claim 1 wherein the interactions with the user are made via a World Wide Web graphical interface.

5. The computer implemented process of claim 1 wherein the new password is the user's forgotten password.

6. An apparatus for authenticating a user's identity before resetting a password, the apparatus comprising:
  a processor;
    a memory connected to the processor;
    a remotely accessible user interface running in the memory;
    program instructions to connect a password reset program to an e-mail repository of a user, a network event log of the user located on a server, and a local event log saved on a workstation computer of the user, to select a data source from at least one of the e-mail repository, the network event log located on the server, or the local event log saved on the workstation computer, receive an identification of the user, responsive to receiving the identification of the user access a record located in the data source containing an information related to a recent computer activity of the user recorded in the data source, generate an authentication question and corresponding answer based on the record, ask the user the authentication question, receive a reply to the authentication question, compare the reply to the corresponding answer, and responsive to the reply matching the corresponding answer, provide a new password to the user;
  wherein the data source is the e-mail repository and the record is an email message,
  wherein the network event log contains an information regarding at least one of how many times the user logged on to the network, how many times the user logged off the network, how many times a certain file was accessed on the network, a recent chat session, a recent instant messaging session, a recently accessed web site, or a computer application accessed by the user;
  wherein the local network log contains a record regarding at least one of how many times the user restarted the computer, how many times the user experienced a computer crash, how many times the user removed a CD, how many times the user removed a DVD, how many times the user connected a personal display assistant, how many times the user connected an MP3 player to the computer, or how many times the user connected the computer to a wireless network within a fixed period of time; and
  wherein a prompt provides a recipient, a date, and a time of the email message and the authentication question asks for at least one of a set of non-trivial key words included in the email message, a name of a blind-copied recipient of the email message, whether the email message received a response, whether the email message was filed, whether the email message was deleted, whether the email message has any attachments or whether the email message has any reply messages;
  wherein the program instructions are stored on a non-transitory computer readable medium for running on the processor via the memory.

7. The apparatus of claim 6 wherein the user must reply with a sub-set of the set of non-trivial key words within a predefined number of attempts.

8. The apparatus of claim 6 wherein the user interface is a computerized telephone switch adapted to use voice recognition software and speech synthesis software.

9. The apparatus of claim 6 wherein the user interface is a World Wide Web graphical interface.

10. The apparatus of claim 6 wherein the user interface combine voice, text and graphics adapted for use with wireless communication devices such as cellular phones and PDAs.

11. The apparatus of claim 6 wherein the identity authentication programs provides the user's forgotten password.

12. A computer program product for authenticating a user's identity before resetting a password, comprising:
  a non-transitory computer readable storage medium;
  first program instructions for connecting a password reset program to an e-mail repository of a user, a network event log of the user located on a server, and a local event log saved on a workstation computer of the user;
  second program instructions for selecting a data source from at least one of the e-mail repository, the network event log located on the server, and the local event log saved on the workstation computer;
  third program instructions for receiving a user identification;
  fourth program instructions for accessing, responsive to receiving the identification of the user, a record located in the data source containing an information related to a recent computer activity of the user recorded in the data source;
  fifth program instructions for generating an authentication question and corresponding answer based on the accessed record;
  sixth program instructions for asking a user the authentication question;
  seventh program instructions for receiving a reply to the authentication question;
  eighth program instructions for comparing the reply to the corresponding answer; and
  ninth program instructions for providing, responsive to the reply matching the corresponding answer, a new password to the user;
  wherein the data source is an e-mail repository and the record is an e-mail message;
  wherein the network event log contains an information regarding at least one of how many times the user logged on to the network, how many times the user logged off the network, how many times a certain file was accessed on the network, a recent chat session, a recent instant messaging session, a recently accessed web site, and a computer application accessed by the user;
  wherein the local network log contains a record regarding at least one of how many times the user restarted the computer, how many times the user experienced a computer crash, how many times the user removed a CD, how many times the user removed a DVD, how many times the user connected a personal display assistant, how many times the user connected an MP3 player to the computer, and how many times the user connected the computer to a wireless network within a fixed period of time; and wherein a prompt provides a recipient, a data, and a time of the email message and the authentication question asks for at least one of a set of non-trivial key words included in the email message, a name of a blind-copied recipient of the email message, whether the email message received a response, whether the email message was filed, whether the email message was deleted, whether the email message has any attachments and whether the email message has any reply messages;

wherein the first through the ninth program instructions are stored on the non-transitory computer readable storage medium.

13. The computer program product of claim 12 wherein the user must reply with a sub-set of the set of non-trivial key words within a predefined number of attempts.

14. The computer program product of claim 12 wherein the interactions with the user are made via voice telephony.

15. The computer program product of claim 12 wherein the interactions with the user are made via a World Wide Web graphical interface.

\* \* \* \* \*